United States Patent [19]

Wachi

[11] 4,183,079

[45] Jan. 8, 1980

[54] DC-AC INVERTER

[75] Inventor: Shigeaki Wachi, Tokyo, Japan

[73] Assignee: Sony Corporaton, Tokyo, Japan

[21] Appl. No.: 920,463

[22] Filed: Jun. 29, 1978

[30] Foreign Application Priority Data

Jul. 5, 1977 [JP] Japan ................................ 52-80258

[51] Int. Cl.$^2$ .......................................... H02M 3/335
[52] U.S. Cl. ..................................... 363/17; 363/132; 336/212
[58] Field of Search ............... 336/178, 212, 233, 234; 363/17, 22, 131, 132, 133

[56] References Cited

U.S. PATENT DOCUMENTS

| | | | |
|---|---|---|---|
| 2,954,531 | 9/1960 | Johnson | 363/16 X |
| 3,327,244 | 6/1967 | Fay et al. | 363/22 X |
| 3,739,255 | 6/1973 | Leppert | 336/212 X |
| 3,781,740 | 12/1973 | Kirmis et al. | 336/212 X |
| 4,031,454 | 6/1977 | Suzuki et al. | 331/113 A X |

*Primary Examiner*—William M. Shoop
*Attorney, Agent, or Firm*—Lewis H. Eslinger; Alvin Sinderbrand

[57] ABSTRACT

In a DC-AC inverter having a switching circuit connected between DC input terminals and being controlled by pulses from an oscillation transformer to provide an AC output from which voltage and current feedbacks are applied to the transformer for maintaining oscillation thereof; the core of the oscillation transformer is formed, in part, of a core material having a large saturation magnetic flux density and, in part, of a core material having a high Curie temperature so as to provide the inverter with both a high efficiency and a stable oscillation frequency. The DC-AC inverter is particularly suited to be included in a DC-DC converter constituted by applying the AC output of the inverter to a suitable rectifying and smoothing circuit.

8 Claims, 6 Drawing Figures

DC-AC INVERTER

BACKGROUND OF THE INVENTION

1. Field of the Invention

This invention relates generally to a DC-AC inverter, and more particularly is directed to an improved self-excited DC-AC inverter which is especially suited for inclusion in a DC-DC converter.

2. Description of the Prior Art

DC-DC converters have been provided for converting one DC voltage to another DC voltage. Generally, such DC-DC converters include a switching circuit actuated by a control arrangement for converting a DC voltage to an AC voltage, and a rectifier for converting the AC voltage generated by the switching circuit into the desired DC output voltage. As the control arrangement for the switching circuit, an existing DC-DC converter includes an oscillation transformer having a core with windings thereon from which pulses are applied to the switching circuit for controlling the latter in response to an AC voltage and AC current derived from the switching circuit and which are fed back to feedback windings of the oscillation transformer so as to maintain the desired oscillation. In a DC-DC converter of the foregoing type, the efficiency is determined by the permeability of the oscillation transformer core. Therefore, in order to attain high efficiency, a core material of high permeability is required. However, in general, a core material of high permeability has a low Curie temperature. When the temperature of the oscillation transformer increases during use, the oscillation frequency becomes unstable if the transformer has a core with a relatively low Curie temperature. Therefore, it has been very difficult to provide a DC-DC converter which includes a DC-AC inverter of high efficiency and with a stable oscillating frequency.

OBJECTS AND SUMMARY OF THE INVENTION

Accordingly, it is an object of this invention to provide a DC-AC inverter which overcomes the previously mentioned problems, and which is especially suited for inclusion in a DC-DC converter.

More particularly, it is an object of this invention to provide a DC-AC inverter, as aforesaid, which has both high efficiency and high stability of its oscillation or AC output.

A further object is to provide a DC-AC inverter which is particularly suited for inclusion in a DC-DC converter, as aforesaid, and which is of relatively simple construction and easily assembled so as to permit its economical production.

In accordance with an aspect of this invention, in a DC-AC inverter of the type having a pair of DC input terminals, switching means connected between the DC input terminals, control means including an oscillation transformer for controlling the switching means, AC output means connected to the switching means, and feedback means connected between said AC output means and the control means; the oscillation transformer is provided with a core of a first core material with a large saturation magnetic flux density and a high magnetic permeability, and of a second core material having a high Curie temperature so as to combine the attributes of high efficiency and high oscillation stability.

In a preferred application of the above DC-AC inverter according to this invention, the AC output means thereof are connected with a rectifying and smoothing circuit to provide a converted DC output.

The above, and other objects, features and advantages of the invention, will be apparent in the following detailed description of an illustrative embodiment thereof which is to be read in connection with the accompanying drawing.

DESCRIPTION OF A PREFERRED EMBODIMENT

Figure 1:
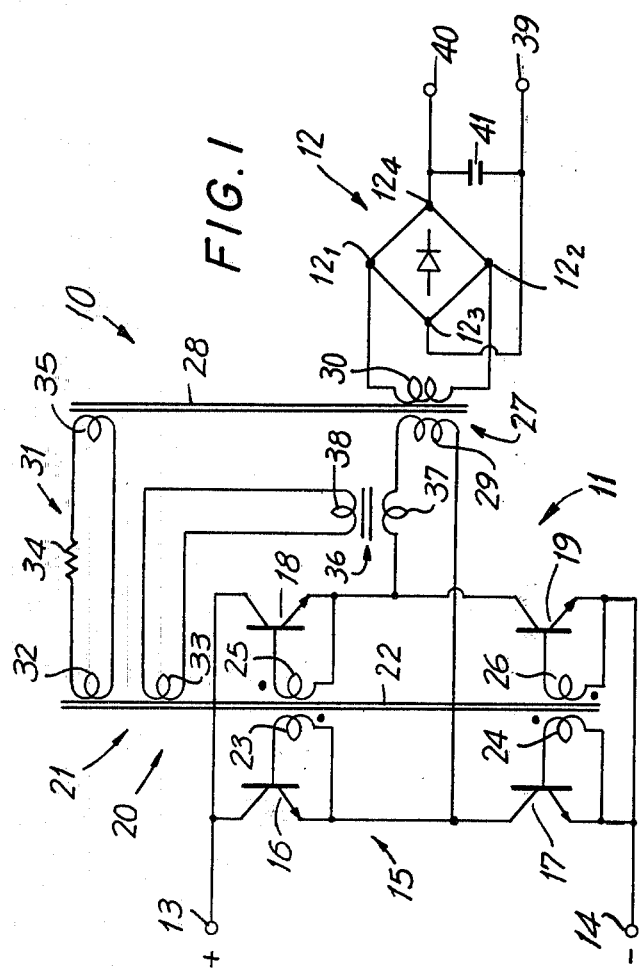
FIG. 1 is a circuit diagram showing a DC-DC converter which includes a DC-AC inverter according to an embodiment of this invention.

Referring to the drawings in detail, and initially to FIG. 1 thereof, it will be seen that a DC-DC converter 10 is there shown to generally comprise a DC-AC inverter 11 and a rectifier 12. More particularly, the DC-AC inverter 11 is shown to include DC input terminals 13 and 14 between which there is connected a switching circuit 15. The switching circuit 15 is shown to include first, second, third and fourth transistors 16, 17, 18 and 19, respectively, connected in a full-bridge configuration between DC input terminals 13 and 14. More particularly, the collectors of first and third transistors 16 and 18 are connected to DC input terminal 13, the emitters of transistors 16 and 18 are connected to the collectors of the second and fourth transistors 17 and 19, respectively, and the emitters of transistors 17 and 19 are connected to the other DC input terminal 14.

In order to control the operations of switching circuit 15 so as to obtain an AC output, DC-AC inverter 11 is shown to further comprise a control circuit 20 which includes an oscillation transformer 21 having a core 22 with first, second, third and fourth windings 23, 24, 25 and 26 thereon. The windings 23, 24, 25 and 26 are connected between the base and emitter of the first, second, third and fourth transistors 16, 17, 18 and 19, respectively, so as to control the respective transistors in response to the generation of alternating magnetic flux in core 22. More particularly, windings 23, 24, 25 and 26 are arranged on core 22 so that, at any time, pulses applied from windings 23 and 26 to the bases of transistors 16 and 19 will be of a polarity that is opposite to that of pulses being simultaneously applied from windings 24 and 25 to the bases of transistors 17 and 18, respectively.

An AC output circuit is constituted by a transformer 27 having a core 28, a primary winding 29 connected between the emitters of transistors 16 and 18, and a secondary winding 30 in which an AC output voltage is induced in response to the operation of switching circuit 15. In order to actuate switching circuit 15 by control circuit 20, a feedback circuit 31 is connected between the AC output circuit and control circuit 20 and is shown to include feedback windings 32 and 33 arranged on core 22 of oscillation transformer 21 and which have a voltage feedback and a current feedback respectively applied thereto. More particularly, the voltage feedback to feedback winding 32 is applied through a resistor 34 from a feedback winding 35 on the core 28 of transformer 27. The current feedback for feedback winding 33 is provided by an additional transformer 36 having a primary winding 37 connected in series with the primary winding 29 of transformer 27 between the emitters of transistors 16 and 18, and a secondary winding 38 connected to feedback winding 33.

In the case where the DC-AC inverter 11 according to this invention is incorporated in a DC-DC converter, the secondary winding 30 of transformer 27 is connected to a pair of input terminals $12_1$ and $12_2$ of rectifying circuit 12 which may be constituted by a full-wave diode rectifier, and which has a pair of output terminals $12_3$ and $12_4$ respectively connected to DC output terminals 39 and 40 between which a smoothing condenser 41 is connected.

As previously mentioned, windings 23–26 are arranged on core 22 so that pulses applied to the bases of transistors 16 and 19 will have a polarity opposite to that of pulses simultaneously applied to the bases of transistors 17 and 18. Furthermore, transformer 21 is of the saturated-type, while transformers 27 and 36 are of the unsaturated-type. Accordingly, during a half of each cycle of the pulses from windings 23–26, transistors 16 and 19 are turned ON, and transistors 17 and 18 are turned OFF. Therefore, during such half of each pulse cycle, current flows from input terminal 13 through the collector and emitter of transistor 16, primary windings 29 and 37 of transformers 27 and 36, and the collector and emitter of transistor 19 to input terminal 14. During the other half of each cycle of the pulses from windings 23–26, transistors 16 and 19 are turned OFF and transistors 17 and 18 are turned ON. Therefore, current now flows from input terminal 13 through the collector and emitter of transistors 18, primary windings 37 and 29 of transformers 36 and 27 and the collector and emitter of transistor 17 to input terminal 14. Consequently, at every inversion of the pulses generated in windings 23–26, the current flowing through primary windings 29 and 37 undergoes a change in direction with the result that output pulses are obtained at winding 35 of transformer 27 and at winding 38 of transformer 36. These pulses are applied from windings 35 and 38 to feedback windings 32 and 33 on core 22 of transformer 21 so as to effect auto-oscillation of switching circuit 15. Simultaneously, the pulses or AC output voltage generated at winding 30 of transformer 27 is rectified by rectifying circuit 12 and smoothed by condenser 41 so as to provide the desired converted DC voltage at output terminals 39 and 40.

It will be noted that, since winding 35 of transformer 27 picks up a pulse voltage, the feedback from winding 35 to winding 32 is a voltage feedback. On the other hand, a pulse current flows through windings 37 and 29 of transformers 36 and 27 so that a current feedback is applied from secondary winding 38 to feedback winding 33.

By reason of the above feedbacks, auto or self-excited oscillation of switching circuit 15 is maintained to provide an AC output at secondary winding 30 of transformer 27. In the case of a relatively small current through a load connected to the DC output terminals 39 and 40, the pulse current through the windings of transformer 27 is also relatively small and, therefore, the voltage feedback from winding 35 to feedback winding 32 of transformer 21 takes the lead in effecting the auto or self-excited oscillation. On the other hand, when the load current is large, the volume of the current feedback from transformer 36 to feedback winding 33 is increased more than the volume of the voltage feedback from winding 35 to feedback winding 32 so that the current feedback then plays the leading role in establishing and maintaining the auto or self-excited oscillation.

Figure 2:
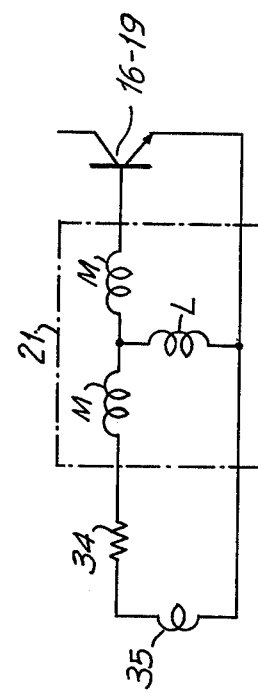
FIG. 2 is an equivalent circuit diagram of an oscillation transformer included in the DC-AC inverter of FIG. 1.

Insofar as the oscillation is caused by the voltage feedback, the oscillating frequency depends on the self-inductance L of transformer 21 and the resistance R of resistor 34. The transformer 21 can be replaced by the equivalent electrical circuit shown in FIG. 2, in which L indicates the self-inductance of such transformer 21 looking in the direction away from the voltage feedback winding 32, and M indicates the mutual-inductance between winding 32 and windings 23–26, with L being smaller than M.

Figure 3A:
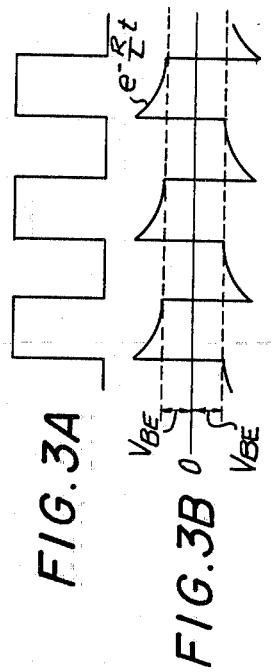
FIGS. 3A and 3B are wave forms to which reference will be made in explaining the operation of the DC-AC inverter shown on FIG. 1.
Figure 3B:

Since a current flows through winding 29 of transformer 27 in opposite directions during alternating half-cycles, a pulse voltage, such as is shown on FIG. 3A, is generated across winding 35. However, since such pulse voltage is applied to the bases of transistors 16–19 through resistor 34 and transformer 21, the wave form of the voltage pulse applied to the base of each of those transistors is modified, as shown on FIG. 3B, so as to have the inclination $\exp[-(R/L)t]$. When the voltage of the pulse applied to the base of any one of the transistors 16–19 either rises or falls to the base-emitter voltage $V_{BE}$, the state or condition of the respective transistor is reversed or inverted, that is, changed from OFF to ON or from ON to OFF, respectively.

On the other hand, in the case of the oscillation caused by the current feedback, the oscillation frequency depends mainly on the saturation magnetic flux density $B_s$ of core 22 of transformer 21. Since transformer 21 can be considered to be driven sufficiently, the transistors 16–19 have their respective states changed or inverted at the saturating point.

The oscillating frequency can be expressed as follows:

$$(1/f = (4 \times N \times S \times B_s)/V_{BE})$$

in which, N is the number of turns in winding 33, S is the cross-sectional area of core 22 of transformer 21, and $B_s$ is the saturation magnetic flux density of the core 22.

Although the above equation determines the oscillating frequency, the oscillating efficiency is primarily determined by the magnetic permeability $\mu$ of core 22 of transformer 21. Therefore, the permeability $\mu$ of the core has to be made substantially large in order to increase the efficiency. However, core materials with a large permeability $\mu$ generally have a low Curie point or temperature, which causes the oscillation to be unstable particularly upon increases in the temperature of transformer 21. Accordingly, improving the efficiency of the DC-AC inverter and stabilizing the oscillating frequency thereof appear to be in conflict with each other.

Furthermore, core materials having a small permeability $\mu$ also generally have a small saturation magnetic flux density $B_s$ which, as indicated in the above equation, determines the oscillating frequency f.

Figure 4:
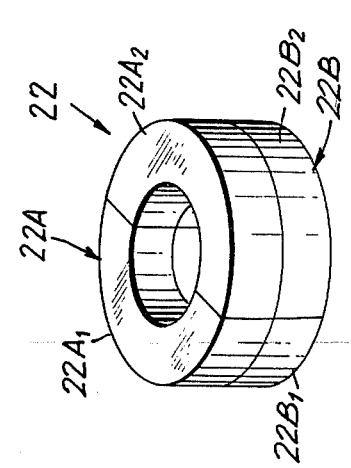
FIG. 4 is a perspective view showing a core of the oscillation transformer which is included in the DC-AC inverter in accordance with this invention.

Generally, in accordance with this invention, the core 22 of oscillation transformer 21 is formed, in part, of a core material having a large saturation magnetic flux density and a large magnetic permeability and, in part, of a core material having a high Curie temperature so as to provide DC-AC inverter 11 with both a high efficiency and a stable oscillation frequency. More particularly, as shown on FIG. 4, core 22 of transformer 21 is preferably formed of ring-shaped magnetic core members 22A and 22B which are superposed on each other to form a body around which windings 23–26, 32 and 33 are toroidally wound. If desired, core members 22A and 22B may be formed of respective semi-circular core pieces $22A_1$, $22A_2$ and $22B_1$, $22B_2$ which are suitably laminated.

Figure 5:
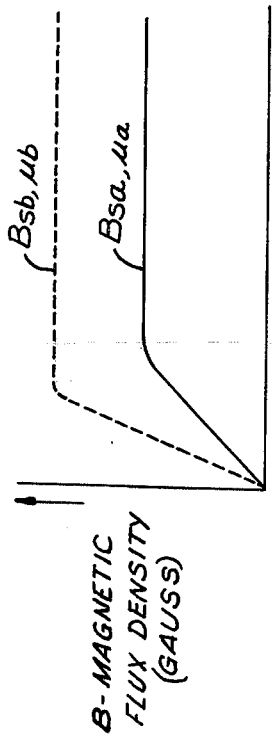
FIG. 5 is a graphic representation of the characteristics of respective core members included in the core of FIG. 4.

In a particular example of this invention, magnetic core member 22A is made from a core material, such as that available commercially from Sony Magne Products under the tradename FBL and consisting essentially of 52 mol. % Fe203, 31 mol. % MnO and 17 mol. % ZnO, which core material has a high Curie temperature, but is burdened by a relatively small saturation magnetic flux density $B_{sa}$, as shown by the solid line on FIG. 5, and by a relatively small magnetic permeability $\mu a$. In the example being described, the magnetic core member 22B is formed of a core material such as that available commercially from Sony Magne Products under the tradename PT5 and consisting essentially of 52 mol. % Fe203, 28 mol. % MnO, and 20 mol. % ZnO, and which has a large saturation magnetic flux density $B_{sb}$, as represented by the broken line on FIG. 5, and a large magnetic permeability $\mu b$, while being burdened by a low Curie temperature. Furthermore, in the case of the core 22 having its core member 22A and 22B formed of the foregoing specific core materials and provided with the configurations shown on FIG. 4, such core members 22A and 22B may each have inner and outer diameters of 7 mm and 13 mm, respectively, and a thickness of 5 mm.

When oscillation transformer 21 has its core 22 formed as described above in accordance with the present invention, the appearance of a large load current causes oscillation of the circuit to be effected by current feedback, with the oscillating frequency being determined by the saturation magnetic flux density $B_{sb}$ of core member 22B which is larger than the saturation magnetic flux density $B_{sa}$ of core member 22A. Further, the oscillation efficiency is maintained high owing to the relatively large permeability $\mu b$ of core member 22B. On the other hand, when the load current is small, a voltage feedback is effective to continue the circuit oscillation. Thus, the ratio of the volume of core member 22A to the total volume of core 22, that is, to the total of the volumes of core members 22A and 22B, may be selected so as to cause oscillation of the circuit to occur at the same frequency when effected by voltage feedback as when effected by current feedback. Thus, even if the load current varies, the oscillating frequency may be stabilized or prevented from changing correspondingly.

Further, even if the temperature of transformer 21 increases during use so as to rise above the Curie temperature of core member 22B, the relatively higher Curie temperature of core member 22A ensures that the last named core member will be effective to maintain the oscillation of the circuit without interruption.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. In a DC-AC inverter having a pair of DC input terminals, switching means connected between said DC input terminals, control means including an oscillation transformer for controlling said switching means, AC output means connected to said switching means, and feedback means connected between said AC output means and said control means; the improvement of said oscillation transformer including a core of a first core material with a large saturation magnetic flux density and a large magnetic permeability, and of a second core material having a high Curie temperature.

2. A DC-AC inverter according to claim 1; in which said core includes first and second ring-shaped core members laminated to each other and formed of said first and second core materials, respectively.

3. A DC-AC inverter according to claim 1; in which said switching means includes first, second, third and fourth transistors each having a base, collector and emitter and being connected in a bridge configuration with the collectors of said first and third transistors connected to one of said input terminals, the emitters of said first and third transistors connected to the collectors of said second and fourth transistors, respectively, and the emitters of said second and fourth transistors connected to the other of said input terminals; and in which said oscillation transformer includes first, second, third and fourth windings wound on said core and connected between the base and emitter of said first, second, third and fourth transistors, respectively.

4. A DC-AC inverter according to claim 3; in which said windings are wound in respective directions such that, in response to alternating magnetic flux generated in said core by said feedback means, said first and fourth windings apply pulses to the bases of said first and fourth transistors which are of a polarity opposed to that of pulses applied by said second and third windings to said second and third transistors, respectively.

5. A DC-AC inverter according to claim 4; in which said feedback means includes means for applying a voltage feedback to said transformer and means for applying a current feedback to said transformer.

6. A DC-AC inverter according to claim 4; in which said feedback means includes first and second feedback transformers having respective first windings connected in series between the emitters of said first and third transistors, respectively, and respective second windings providing current feedback and voltage feedback, respectively; and in which said oscillation transformer has first and second feedback windings on said core, said first feedback winding receiving said current feedback and said second feedback winding being connected with said second winding of said second feedback transformer through a resistor to receive said voltage feedback.

7. A DC-AC inverter according to claim 6; in which said AC output means includes a third winding of said second feedback transformer.

8. A DC-AC inverter according to claim 1; in combination with rectifying and smoothing circuit means connected with said AC output means to provide a converted DC output.

* * * * *